United States Patent
Morelli et al.

(10) Patent No.: US 7,437,150 B1
(45) Date of Patent: Oct. 14, 2008

(54) METHOD FOR WIRELESS DATA EXCHANGE FOR CONTROL OF STRUCTURAL APPLIANCES SUCH AS HEATING, VENTILATION, REFRIGERATION, AND AIR CONDITIONING SYSTEMS

(75) Inventors: Mark Morelli, Milan (IT); Luiz Canizo, Madrid (ES); Mark Hill, Lafayette, NY (US); Gayatri Chaturvedi, Paris (FR)

(73) Assignee: Carrier Corporation, Hartford, CT (US)

( * ) Notice: Subject to any disclaimer, the term of this patent is extended or adjusted under 35 U.S.C. 154(b) by 1547 days.

(21) Appl. No.: 09/684,174

(22) Filed: Oct. 6, 2000

(51) Int. Cl.
  *H04M 3/00* (2006.01)
(52) U.S. Cl. .................. 455/420; 418/419; 418/422.1
(58) Field of Classification Search ............... 455/420, 455/556.2, 569.1, 517, 558, 419, 550.1, 462, 455/466, 418, 422.1, 423, 426.2
See application file for complete search history.

(56) References Cited

U.S. PATENT DOCUMENTS

| | | | | |
|---|---|---|---|---|
| 5,802,467 | A | * | 9/1998 | Salazar et al. ............... 455/420 |
| 5,901,366 | A | * | 5/1999 | Nakano et al. ........... 455/550.1 |
| 5,963,624 | A | * | 10/1999 | Pope .......................... 455/420 |
| 6,343,317 | B1 | * | 1/2002 | Glorikian ................. 455/456.3 |
| 6,393,297 | B1 | * | 5/2002 | Song .......................... 455/466 |
| 6,434,403 | B1 | * | 8/2002 | Ausems et al. ........... 455/556.2 |
| 6,549,773 | B1 | * | 4/2003 | Linden et al. ............ 455/426.1 |

\* cited by examiner

*Primary Examiner*—Joseph Feild
*Assistant Examiner*—Huy D Nguyen
(74) *Attorney, Agent, or Firm*—Bachman & LaPointe, P.C.

(57) ABSTRACT

A method for remote control of structural appliances includes the steps of communicating a structural appliance with a server programmed to accept mobile device commands; communicating a mobile device with the server; issuing the mobile device commands from the mobile device to the server; converting the mobile device commands to structural appliance commands; and issuing the structural appliance commands from the server to the structural appliance, whereby wireless control of the structural appliance is established.

16 Claims, 1 Drawing Sheet

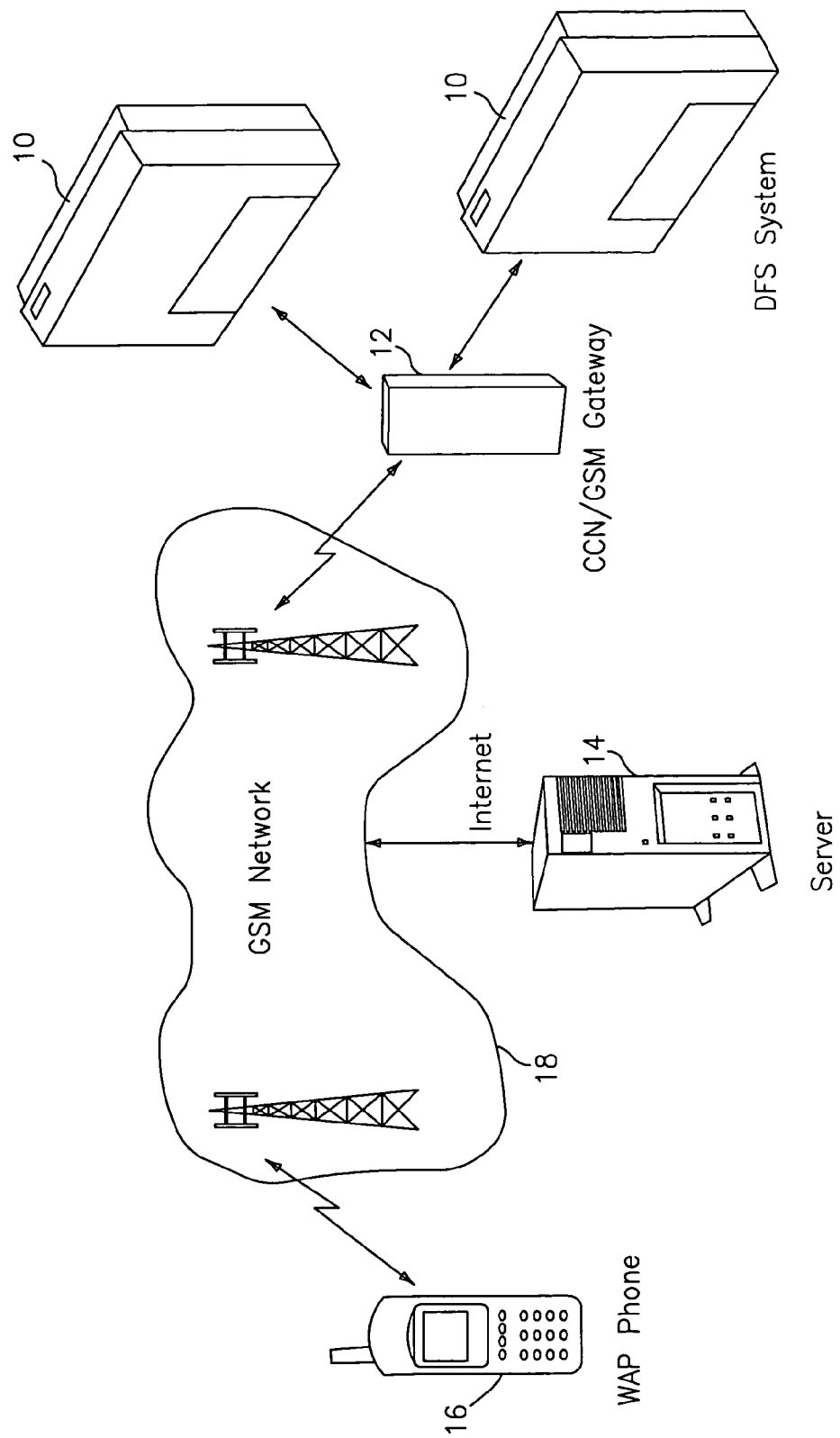

METHOD FOR WIRELESS DATA EXCHANGE FOR CONTROL OF STRUCTURAL APPLIANCES SUCH AS HEATING, VENTILATION, REFRIGERATION, AND AIR CONDITIONING SYSTEMS

BACKGROUND OF THE INVENTION

The invention relates to a method for wireless control of structural appliances and, more particularly, to a method for controlling heating, ventilation, air conditioning, refrigeration and other structural appliance systems through wireless mobile devices.

Structural devices or appliances such as heating, ventilation, refrigeration, air conditioning (HVRAC), elevator equipment, building control and other types of systems and devices are integral to maintaining desired environment, security and the like in business, commercial and residential settings. Many such appliances require manual control and/or programming, as well as on-site maintenance and the like.

It is desirable to make control, maintenance and service of such appliances easier so as to enhance the benefit of such appliances to the user, and to allow service technicians to perform better services, at cheaper cost.

It is therefore the primary object of the present invention to provide a method whereby structural appliances can be controlled and serviced from a remote location.

It is another object of the present invention to provide a method for configuring such structural appliances whereby a user, technicians and the like can access and control such structural appliances utilizing a wireless mobile device.

It is a further object of the present invention to provide a method whereby useful data can be collected from the structural appliance and accessed from a mobile device.

Other objects and advantages of the present invention will appear hereinbelow.

SUMMARY OF THE INVENTION

In accordance with the present invention, the foregoing objects and advantages have been readily attained.

According to the invention, a method for remote control of structural appliances is provided, which method comprises the steps of communicating a structural appliance with a server programmed to accept mobile device commands; communicating a mobile device with said server; issuing said mobile device commands from said mobile device to said server; converting said mobile device commands to structural appliance commands; and issuing said structural appliance commands from said server to said structural appliance, whereby wireless control of said structural appliance is established.

In further accordance with the present invention, a method is provided for allowing remote control of structural appliances, which method comprises the steps of communicating a structural appliance with a server; programming said server to accept mobile device commands; converting said mobile device commands into structural appliance commands, and issuing said structural appliance commands to said structural appliance.

The mobile device is preferably a web-enabled device communicated with the server preferably utilizing wireless application protocol.

In further accordance with the present invention, information is also collected or "mined" from the structural appliances for use in determining best operating parameters, potential malfunction and need for maintenance, and the like.

Typical structural appliances for control in accordance with the present invention include HVRAC systems, elevator systems, building control systems, and the like.

BRIEF DESCRIPTION OF THE DRAWING

A detailed description of preferred embodiments of the present invention follows, with reference to the attached drawing which schematically illustrates the method of the present invention.

DETAILED DESCRIPTION

The invention relates to a method for wireless control of structural appliances and, more particularly, to a method for controlling and obtaining data from structural appliances such as HVRAC systems, elevator systems, building control systems and other appliances.

In accordance with the present invention, structural appliances are communicated or operatively associated with a preferably wireless-accessible device or a server, preferably through a gateway, such that a person utilizing a mobile device can dial into the server and communicate with the structural appliances. The server and gateway are preferably adapted to provide intelligent control capability for the structural appliances.

Referring to the FIGURE, a plurality of appliances 10 are illustrated and communicated with a gateway 12 which is communicated with server 14. As shown, mobile device 16 is utilized to communicate with server 14 and appliances 10 through gateway 12, all through GSM network 18.

As discussed above, appliances 10 may be any combination of desired HVRAC systems, elevator systems, escalator systems, building control systems and the like. Such appliances, especially HVRAC appliances, can be operated at a number of different settings. Further, when operated with gateway 12, appliances can be rendered "intelligent", or be provided with capability to collect useful data related to past performance and the like which can be of interest to users, technicians and/or intermediate entities such as utility providers and the like, to enhance the benefits and useful life of the appliance. According to the invention, a method is provided for remote, preferably wireless, control of such appliances and operating settings or parameters, and remote, preferably wireless, access to such data. Gateway 12 is operatively associated with appliances 10 utilizing conventional hardware and software which are readily available to the person of ordinary skill in the art.

Gateway 12 as shown may suitably be any acceptable device such as a work station, personal computer, network of computers or other programmable device which is programmed to receive commands and issue them to the appropriate appliance 10. Gateway 12 is also preferably adapted to receive information, data and replies from appliances 10 for sending to server 14.

Server 14 is preferably programmed to store a database of appliance information including appliance identification, passwords, language, configuration, and telephone numbers or email addresses and the like for contacting users and technicians.

Server 14 may be any conventional preferably wireless-accessible device, most preferably accessible via GSM network global computer network, intranet, internet and the like, most preferably accessible via GSM network server 18 which is adapted to accept communications from mobile device 16, and preferably for accepting wireless access protocol (WAP) commands. In accordance with one preferred embodiment of the invention, commands will be received by server 14 in this protocol from a mobile device such as a WAP telephone, PDA and the like, and server 14 is preferably programmed and adapted to convert such protocol into machine-understandable commands and to issue such commands back through GSM network 18 to gateway 12 and the desired appliance 10. This can be accomplished utilizing any of a wide variety of conventional conversion or translation programs, the use and selection of which would be well known to a person of ordinary skill in the art.

Gateway 12 preferably is adapted to convert mobile device commands such as WAP commands and information into structural appliance or machine-understandable commands and information and vice versa.

Mobile device 16 may be any suitable web-enabled preferably portable device, a PDA device, preferably a web-enabled phone utilizing wireless access protocol, cellular telephone, laptop or portable computer or other like wireless communication device, or may be a desktop computer, or other wired communication device as well within the broad scope of the present invention. Of course, the preferred device is a web-enabled wireless device which allows for the most versatility and benefit of the present invention.

In use, a user would access server 14 with mobile device 16, and server 14 would present the user with a display of options such as a requested password for access, a series of appliances which can be controlled, and the like. The user can select an option or enter a password, which results in WAP commands going through GSM network 18 to server 14. As set forth above, server 14 is programmed to translate the WAP or mobile device issued commands into commands meaningful to gateway 12 for controlling the desired appliance. Appliance 10 upon receiving the commands would enact the command, and respond with any appropriate or requested information.

The password may also be used by server 14 to identify which of a plurality of appliances the user is authorized to control, the expected language and protocol with which to communicate with the user, and other useful user specific data such as US/metric units and the like.

If the user is a dealer or an intermediate provider, the password could be utilized to identify the appliances belonging to customers of that dealer for which access is authorized.

In connection with an appliance 10 which may be an HVRAC system, for example, an air conditioning system, the mobile device command could be a command identifying the air conditioning system, and indicating a particular temperature setting at which to operate, accompanied with a request for data as to energy consumption by the air conditioner over the past operation cycle.

Appliance 10 would receive suitable instructions enacting this command from gateway 12, change to operation at the desired setting, and issue machine-language responses to the request for data to gateway 12. Gateway 12 would then pass such information to server 14, which would convert the responsive information to a suitable format and send the information to mobile device 16 as desired. In the presently described embodiment, server 14 would convert the information to WAP and display one or more pages on mobile device 16 containing the requested information and, preferably, confirmation of the operating instructions.

According to the invention, either server 14 or gateway 12, or both, acts as a protocol translator between mobile device 16 and appliances 10. Preferably this function is carried out by gateway 12.

It should be readily appreciated that a user of appliances 10 and mobile device 16 could readily utilize this method in order to monitor energy consumption of appliance 10 while nevertheless setting appliance 10 to operate at a desired condition or parameter, all from any location whatsoever.

It should also be readily appreciated that the method in accordance with the present invention could be utilized by a technician to issue commands requesting identification of any unusual conditions experienced by appliance 10 and stored by gateway 12, and could also be utilized by a technician to issue a command for a machine to perform a diagnostic routine, for example, and provide results to gateway 12. In this manner, routine maintenance can be carried out on appliances 10 without the need for the technician to travel to the specific location of appliance 10, thereby making maintenance easier and reducing cost of same.

Another advantageous application of the method of the present invention is in connection with providing the possibility for broader service offerings from intermediate service providers such as utility companies. For example, the method of the present invention could be utilized to reduce energy consumption of selected and authorized appliances during peak demand days and the like so as to provide for easier energy management on a broad scale, or to allow pay for use type arrangements, and the like.

In addition, one or more of appliances 10, gateway 12 and server 14 could be adapted and configured to monitor for fault or failure conditions indicating failure of an appliance 10, or imminent failure of an appliance 10, and to provide this information to a technician through server 14 via mobile device 16 whereby further preventative maintenance can be conducted as appropriate.

For example, gateway 12 may be adapted to run a polling routine that scans one or more appliances for faults, which may be defined as non-zero values in a specific byte of a block of data received.

Upon detecting a fault, gateway 12 is preferably adapted to communicate to server 14, which can send a WAP message, pager message, email and the like to the proper personnel which identifies the appliance and type of fault.

As set forth above, gateway 12 and appliances 10 may be operated so as to collect and store raw data that can be retrieved by interested parties. This data can be related to all operating conditions of the appliance, such as air quality, heating and cooling efficiency, energy use, maintenance and diagnostic records and the like.

In accordance with a further embodiment of the present invention, the method of the present invention is particularly useful for providing remote control of heating, ventilation and air conditioning (HVAC) systems, especially those which are non-central systems such as window mounted units, Duct Free Split products and the like, since such systems typically have less-sensitive thermostats and are therefore more difficult to control. With such devices, the method of the present invention is ideal in allowing for remote operation of the system, for example to cool when desired and the like.

In accordance with a further embodiment of the invention, and as mentioned above, it may be desirable to provide utility companies such as energy providers with password access to HVAC systems of various energy provider customers so that the energy provider can manage energy consumption during peak demand periods. It may be advantageous to the energy provider to couple such a service with incentives to the energy customers whereby customers would then have incentive to enroll or register various HVAC equipment with the energy provider so that the energy provider can be allowed to control such devices.

The method of the present invention advantageously creates an integrated command, control and maintenance system for multiple types of equipment that does not require a personal computer or large network. As set forth above, benefits to the end user include personalized comfort control features for home or small office environments, centralized comfort control features for building management, potentially reduced energy costs, more readily understandable information regarding air quality levels which can be used to adjust operation accordingly, and potentially lower maintenance costs.

Also as set forth above, benefits to technicians or equipment manufacturers include lower service and maintenance costs, and others. In the meantime, the method of the present invention further provides benefits to intermediate companies such as utilities, telecommunication operators and the like by allowing for broader content service offerings. These benefits are all provided by the enhanced efficiency involved in capture and dissemination of equipment operational data, as well as the ease of command, which are all facilitated by the method of the present invention.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

The invention claimed is:

1. A method for remote control of structural appliances, comprising the steps of:
   communicating a structural appliance with a server programmed to accept mobile device commands;
   communicating a mobile device with said server;
   issuing said mobile device commands from said mobile device to said server;
   converting said mobile device commands to structural appliance commands; and
   issuing said structural appliance commands from said server to said structural appliance, whereby wireless control of said structural appliance is established, wherein said server is communicated with said structural appliance through a gateway, further comprising the steps of:
   storing structural appliance information at one of said structural appliance, said gateway and said server; and
   transmitting said structural appliance information from said server to said mobile device, and wherein said structural appliance information is provided in structural appliance format to said gateway, wherein said gateway converts said structural appliance format to mobile device format, and wherein said server transmits said structural appliance information to said mobile device in said mobile device format.

2. The method according to claim 1, wherein said structural appliance information comprises at least one type of information selected from the group consisting of diagnostic information, maintenance information, operating parameters, environmental information and combinations thereof.

3. The method according to claim 1, wherein said structural appliance is selected from the group consisting of heating, ventilation, air conditioning, refrigeration, building control and elevator appliances.

4. The method according to claim 1, wherein said mobile device is a web enabled device.

5. The method according to claim 4, wherein said mobile device is communicated with said server utilizing wireless application protocol.

6. The method according to claim 1, wherein said mobile device and said structural appliance are communicated with said server by a global satellite messaging network.

7. The method according to claim 6, wherein said server is communicated with said global satellite messaging network by a global computer network.

8. The method according to claim 7, wherein said mobile device issues said mobile device commands in wireless application protocol, and further comprising the step of converting said wireless application protocol to structural appliance protocol commands.

9. The method according to claim 7, wherein said server is adapted to display a plurality of options on said mobile device, whereby a user of said mobile device can select from said plurality of options so as to issue said mobile device commands.

10. The method according to claim 1, wherein said mobile device is communicated with said server from a remote location.

11. The method according to claim 10, wherein said server is a wireless-accessible server.

12. The method of claim 1, wherein said step of communicating said structural appliance with said server comprises communicating a plurality of structural appliances with said server, and wherein said step of communicating said mobile device with said server includes presenting a selection of said plurality of structural appliances at said mobile device.

13. A method for allowing wireless control of structural appliances, comprising the steps of:
   communicating a structural appliance with a server;
   programming said server to accept mobile device commands;
   converting said mobile device commands into structural appliance commands; and
   issuing said structural appliance commands to said structural appliance, wherein said server is communicated with said structural appliance through a gateway, further comprising the steps of:
   storing structural appliance information at one of said structural appliance, said gateway and said server; and
   transmitting said structural appliance information from said server to said mobile device, and wherein said structural appliance information is provided in structural appliance format to said gateway, wherein said gateway converts said structural appliance format to mobile device format, and wherein said server transmits said structural appliance information to said mobile device in said mobile device format.

14. A method for remote control of an HVAC system, comprising the steps of:
   communicating a HVAC system with a server programmed to accept mobile device commands;
   communicating a mobile device with said server;
   issuing said mobile device commands from said mobile device to said server;
   converting said mobile device commands to HVAC system commands; and
   issuing said HVAC system commands from said server to said HVAC system, whereby wireless control of said HVAC system is established, wherein said server is communicated with said HVAC system through a gateway, further comprising the steps of:
   storing HVAC system information at one of said HVAC system, said gateway and said server; and
   transmitting said HVAC system information from said server to said mobile device, and wherein said HVAC system information is provided in HVAC system format to said gateway, wherein said gateway converts said HVAC system format to mobile device format, and wherein said server transmits said HVAC system information to said mobile device in said mobile device format.

15. The method according to claim 14, wherein said HVAC system is a non-central HVAC system.

16. The method according to claim 14, wherein said mobile device is operated by an energy provider and wherein said HVAC system comprises a plurality of HVAC systems of customers of said energy provider.

\* \* \* \* \*